(12) United States Patent
Potkonjak

(10) Patent No.: US 8,041,992 B2
(45) Date of Patent: Oct. 18, 2011

(54) INPUT COMPENSATED AND/OR OVERCOMPENSATED COMPUTING

(75) Inventor: Miodrag Potkonjak, Los Angeles, CA (US)

(73) Assignee: Technology Currents LLC, Wilmington, DE (US)

( * ) Notice: Subject to any disclaimer, the term of this patent is extended or adjusted under 35 U.S.C. 154(b) by 276 days.

(21) Appl. No.: 12/463,982

(22) Filed: May 11, 2009

(65) Prior Publication Data

US 2010/0287404 A1 Nov. 11, 2010

(51) Int. Cl.
*G06F 11/00* (2006.01)
(52) U.S. Cl. .......................................................... 714/10
(58) Field of Classification Search ...................... 714/10
See application file for complete search history.

(56) References Cited

U.S. PATENT DOCUMENTS

| | | | | |
|---|---|---|---|---|
| 5,179,695 A | * | 1/1993 | Derr et al. ........................ | 714/31 |
| 6,567,937 B1 | * | 5/2003 | Flores et al. ..................... | 714/46 |
| 6,782,345 B1 | * | 8/2004 | Siegel et al. ................... | 702/183 |
| 6,849,174 B2 | * | 2/2005 | Hada et al. ..................... | 205/781 |
| 7,340,643 B2 | * | 3/2008 | Grochowski et al. ........... | 714/11 |
| 7,480,838 B1 | * | 1/2009 | Wilkerson et al. ............ | 714/700 |
| 7,516,358 B2 | * | 4/2009 | Haefliger et al. .............. | 714/10 |
| 7,671,627 B1 | * | 3/2010 | Somani et al. ................. | 326/46 |
| 2004/0078410 A1 | | 4/2004 | Porten et al. | |
| 2005/0022094 A1 | * | 1/2005 | Mudge et al. ................. | 714/758 |
| 2006/0123308 A1 | | 6/2006 | Eslick et al. | |
| 2007/0150784 A1 | | 6/2007 | Pan et al. | |
| 2008/0082598 A1 | | 4/2008 | Dapper et al. | |
| 2008/0091990 A1 | * | 4/2008 | Bruce et al. ................... | 714/721 |
| 2008/0109679 A1 | * | 5/2008 | Wright et al. ................... | 714/37 |
| 2009/0218178 A1 | * | 9/2009 | Lence-Barreiro ............. | 187/393 |
| 2009/0282293 A1 | * | 11/2009 | Martch et al. .................. | 714/43 |

OTHER PUBLICATIONS

International Search Report and Written Opinion, issued in International Application No. PCT/US2010/033608, mailed Sep. 8, 2010, 8 pages.
Austin et al., "Making Typical Silicon Matter with Razor," Computer, Mar. 2004, vol. 37, No. 3, pp. 57-65.
Bower et al., "A Mechanism for Online Diagnosis of Hard Faults in Microprocessors," Proceedings of the 38th Annual IEEE/ACM International Symposium on Microarchitecture, Nov. 2005, 12 pages.
Chandrakasan et al., "Optimizing Power Using Transformations," IEEE Transactions on Computer-Aided Design of Integrated Circuits and Systems, Jan. 1995, vol. 14, No. 1, pp. 12-31.
Ernst et al., "Razor: A Low-Power Pipeline Based on Circuit-Level Timing Speculation," Proceedings of the 36th International Symposium on Microarchitecture, Dec. 2003, 12 pages.
Kirovski et al., "Cut-Based Functional Debugging for Programmable Systems-on-Chip," IEEE Transactions on Very Large Scale Integration (VSLI) Systems, Feb. 2000, vol. 8, No. 1, pp. 40-51.
Kirovski et al., "Improving the Observability and Controllability of Datapaths for Emulation-Based Debugging," IEEE Transactions on Computer-Aided Design of Integrated Circuits and Systems, Nov. 1999, vol. 18, No. 11, pp. 1529-1541.

(Continued)

*Primary Examiner* — Bryce Bonzo
(74) *Attorney, Agent, or Firm* — Schwabe, Williamson & Wyatt, P.C.

(57) ABSTRACT

Techniques are generally described for correcting computation errors via input compensation and/or input overcompensation. In various examples, errors of a computation may be detected, and input compensation and/or overcompensation to correct the errors may be created. The disclosed techniques may be used for power and/or energy minimization/reduction, and debugging, among other applications. Other embodiments and/or applications may be disclosed and/or claimed.

28 Claims, 6 Drawing Sheets

OTHER PUBLICATIONS

Koushanfar et al., "Symbolic Debugging of Embedded Hardware and Software," IEEE Transactions on Computer-Aided Design of Integrated Circuits and Systems, Mar. 2001, vol. 20, No. 3, pp. 392-401.

Li et al., "Spin Detection Hardware for Improved Management of Multithreaded Systems," IEEE Transactions on Parallel and Distributed Systems, Jun. 2006, vol. 17, No. 6, pp. 1-14.

Mehrara et al., "Low-cost Protection for SER Upsets and Silicon Defects," Proceedings of the conference on Design, Automation and Test, Apr. 2007, pp. 1146-1151.

Potkonjak et al., "Maximally and Arbitrarily Fast Implementation of Linear and Feedback Linear Computations," IEEE Transactions on Computer-Aided Design of Integrated Circuits and Systems, Jan. 2000, vol. 19, No. 1, pp. 30-43.

Powell et al., "Heat-and-Run: Leveraging SMT and CMP to Manage Power Density Through the Operating System," Proceedings of the 11th International Conference on Architectural Support for Programming Languages and Operating Systems, Oct. 2004, pp. 260-270.

Sanz et al., "System-level Process Variability Compensation on Memory Organizations of Dynamic Applications: A Case Study," Proceedings of the 7th International Symposium on Quality Electronic Design, Mar. 2006, 7 pages.

Shyam et al., "Ultra Low-Cost Defect Protection for Microprocessor Pipelines," Proceedings of the 12th International Conference on Architectural Support for Programming Languages and Operating Systems, Oct. 2006, pp. 73-82.

* cited by examiner

INPUT COMPENSATED AND/OR OVERCOMPENSATED COMPUTING

BACKGROUND

Computational errors are pervasive in computational, communication, and storage systems. There may be a wide variety of errors ranging from transitive to permanent, from design to manufacturing, from ones with no or negligible impact to ones that drastically may alter a large percentage of results and/or data. A wide consensus may exist that quantity and impact of errors may increase with each new generation of silicon and other implementation technologies. The increase in quantity and impact of errors may be due to exponential feature size shrinking, operation at low voltages, and exponentially increasing level of integration.

Computational errors may have the greatest impact in low power design, and/or low power device operation and debugging, for example, mobile and wireless systems. Mobile and wireless systems may have operational and environmental conditions that may be harsh and may require a low operating voltage to save energy. Mobile and wireless systems may also be subject to cost sensitivity and short opportunity windows that may have an additional amplification impact on computational errors.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION OF EMBODIMENTS

Figure 1:
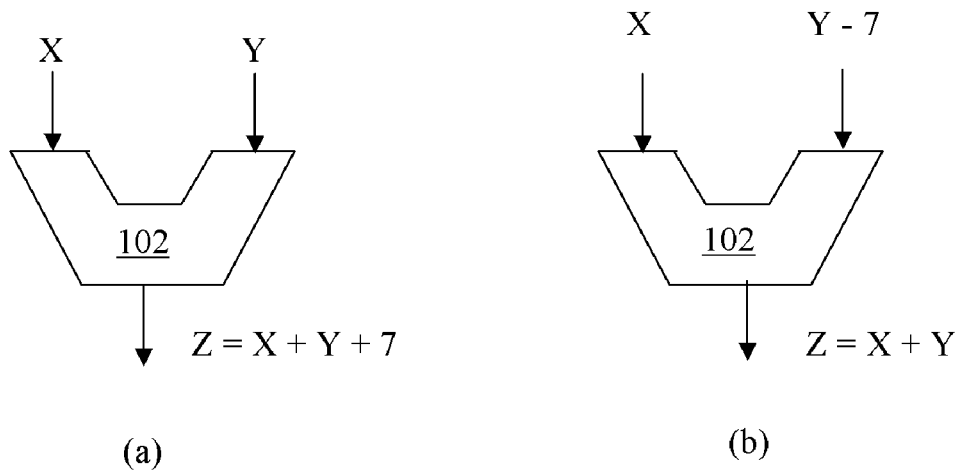
FIG. 1a-1b illustrate input compensation in accordance with various embodiments.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alias to methods, apparatus, systems and computer program products related to input compensated and/or overcompensated computing.

The present disclosure includes techniques that correct computation error through input compensation or overcompensation. In various embodiments, computational errors of a program may be detected and in turn, corrected, by altering the data that are inputs to the program. In various embodiments, the computational errors may be corrected, or substantially corrected as required by quality of service (QoS) criteria, by altering as small as possible number of (primary) inputs. In various embodiments, the techniques may be used to correct permanent errors due to manufacturing variability.

Referring now to FIGS. 1a and 1b where input compensation of the present disclosure is illustrated. FIG. 1a shows an example adder 102 that for a particular set of input variables X and Y, may consistently produce the incorrect example output of X+Y+7. FIG. 1(b) illustrates following detection of the error, it may be sufficient to correct (reduce) one of the inputs by 7 (input compensation). Based on the input compensation, the example adder 102 may consistently generate the correct output of X+Y.

Figure 2:
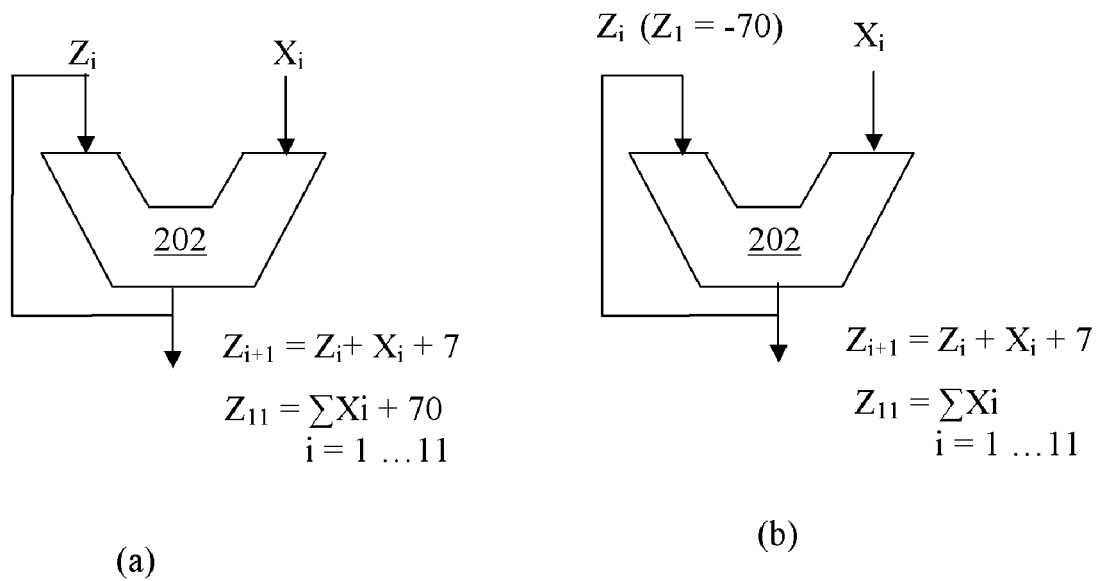
FIGS. 2a-2b illustrate input overcompensated computing, in accordance with various embodiments.

FIGS. 2(a) and 2(b) illustrate input overcompensated computing, in accordance with various embodiments. FIG. 2(a) illustrates an example program executed on a possible faulty adder 202 where the result is repeatedly increased by a value of 7. In some examples, if the goal was to compute correctly only example result Z11 it may be sufficient to subtract a value of 70 from input Z11, as illustrated by FIG. 2(b). On the other hand, if the goal was to approximately compute variables, Z1, . . . , Z10 with a maximal error of a value 35, then it may be sufficient to reduce input variable Z1 by a value of 35. Therefore, in various embodiments, it may be possible to correct more errors than the number of inputs that are corrected.

As mentioned earlier, computational errors may be transitive or permanent. The computational errors may be caused by design or manufacturing, and may occur in various applications, e.g. wireless circuits. In various embodiments, the computational errors may be predicted using simulation or parallel execution. In various embodiments, as alluded to in the earlier illustrations, the number of corrections may be minimized. A possible benefit from employing minimal number of corrections is that the corrections may be more easily compressed and decompressed.

In various embodiments, the computational errors may be detected and in turn, may be corrected. The computational errors may be corrected by altering data inputted to a program executed on a programmable processor or altering data processed by an application specific processor. In various embodiments, computational errors may be corrected, or substantially corrected to meet quality of service (QoS) criteria. Correcting or substantially correcting computational errors to meet QoS criteria may include altering as small as possible number of (primary) inputs.

Figure 3:
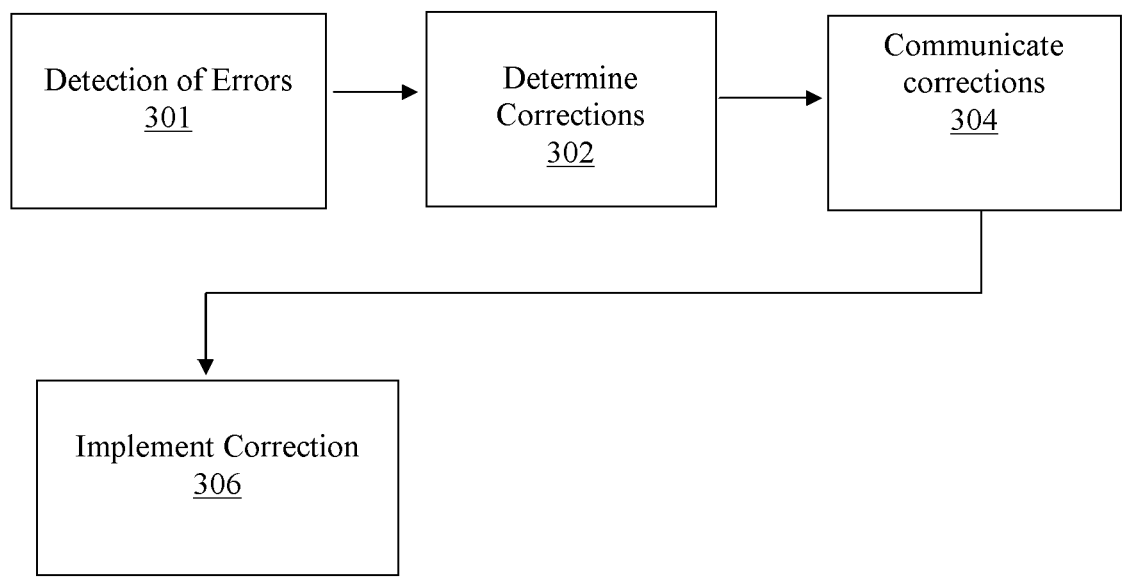
FIG. 3 illustrates a method in accordance with various embodiments.

FIG. 3 illustrates a method of the present disclosure in accordance with various embodiments. As shown in FIG. 3, the disclosed approach may include up to four subtasks, to improve e.g. the energy consumption or other design or operational objectives (e.g. resiliency against soft errors):

(i) Detection of errors (block 302);
(ii) Determine corrections (block 304);
(iii) Communicate corrections (block 306); and
(iv) Implement corrections (block 308).

The method may begin at block 302 (Detection of Errors) where the error of a computation performed on a target computing platform may be detected. Moving from block 302 to block 304 (Determine corrections), the compensation or overcompensation to one or more inputs of the computation (corrections) to eliminate or reduce the detected error may be determined. From block 304, the method may move to block 306 (Communicate corrections), where the determined corrections may be communicated to the target computing platform. Moving from block 306 to block 308 (Implement Corrections), on receipt, the target computing platform may employ the communicated correction (compensation or overcompensation to input) to eliminate or reduce the errors when performing the computation on the target computing platform. The target computing platform may associate the provided compensation or overcompensation with the corresponding input, and employ the compensation or overcompensation in conjunction with the input when performing in the computation. In doing so, the target computing platform may first apply the compensation/overcompensation to the input before providing the compensated or overcompensated input to the computation.

In various embodiments, both the program and input data used for the computation are assumed known in advance. Therefore, for these embodiments, all four subtasks may be executed in off-line mode.

Figure 4A:
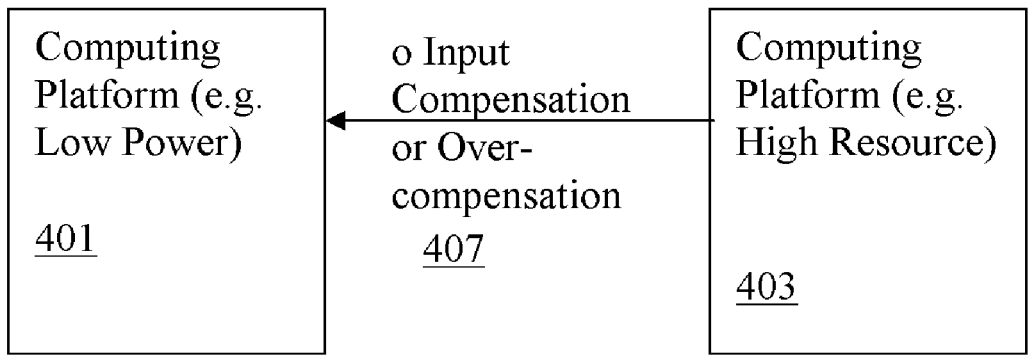
FIGS. 4a-4b illustrate more methods in accordance with various embodiments.
Figure 4B:
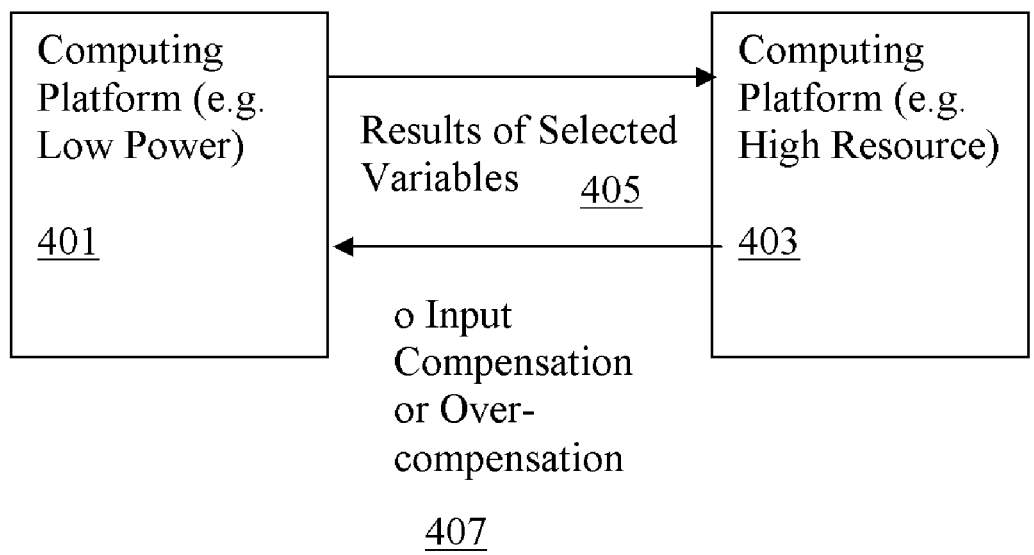

FIGS. 4a and 4b illustrate two processors or computing platforms configured to practice the present disclosure, in accordance with various embodiments. As shown, the first three subtasks (described earlier with reference to FIG. 3) may be performed in one or more processors or computing platforms from among computing platforms 401 and 403. In many of these embodiments, a computing platform 403 may have a high level of processing power or computing resources (e.g., multiple processors, additional memory, etc.) and may also have readily available source of energy (e.g., power plug-in versus battery-supplied power).

In several of these embodiments, a computing platform from among computing platforms 401 and 403 may be employed for error detection, while another computing platform may be employed for creation of error corrections (i.e. compensations or overcompensation to the inputs of the computation). In various embodiments, a computing platform may analyze the data and creation of error corrections for the program only once and may store the required corrections for possible distribution to other computing platforms at a later time.

In various embodiments, as illustrated in FIG. 4a, computing platform 403 may be independently provided with a program and input data for performing the computation (that mirrors the program or input data to be executed on computing platform 401) to execute or simulate the program execution with the input data in parallel. For these embodiments, it may not be necessary for processor or computing platform 401 to communicate computation results to computing platform 403 for error detection. However, in alternate embodiments, the present disclosure may be practiced with computer platform 401 transmitting the computation results of selected variables 405 to enable computing platform 403 to detect errors based on the computation results transmitted, and thereafter create error corrections (i.e. compensations or overcompensations to the inputs of the computation). In either case, for these embodiments, computing platform 403 may communicate input compensation or over-compensation 407 error corrections to computing platform 401 as shown in FIGS. 4a and 4b.

In various embodiments, the corrections (compensation or overcompensation to be applied to the input) may be determined by computing platform 403, or delegated to yet another computing platform (not shown). If delegated, computing platform 403 may provide the detected errors to the computing platform to determine the corrections.

In various embodiments, the four subtasks illustrated in FIG. 3 may be performed in real-time or in near-real time. Typically, for these embodiments, fast communication and fast processing are available to enable meeting the real-time requirements of the computing platforms, while practicing the method of the present disclosure.

In various embodiments, error detection, correction determination and computation subtasks, as described above, may be performed on different computing platforms. In various embodiments, the error detection, correction determination and computation subtasks may be conducted on the same computing platform that eventually uses the program again and often multiple times. The error detection and correction determination subtasks may be performed in modes of operation when power consumption may be relatively high and energy or power is readily available energy (e.g., plug-in power). The computation subtasks may be performed in modes of operation when power consumption may be relatively low or energy is not readily available.

Note that in various embodiments, since the error corrections may not be conducted in real-time, the analysis and the creation of input error corrections may nonetheless be done in modes when power consumption may be relatively low or power is no longer readily available (e.g., battery-provided power). For example, error detection and calculation can be done a low voltage and thus at very low speed.

In various embodiments, substantially complete correctness or error-free results may be required. However, in other embodiments, that is, for applications such as audio and video streams, sensor networks, graphics, gamming, and so forth, it may be sufficient to maintain either objective or subjective QoS. In various environments, QoS may be expressed as one of error norms. In various embodiments, the profile of a specific user in terms of the specified QoS or the maximal energy spent on a particular program execution may be targeted. In various embodiments, QoS and consumed energy in a primal/dual framework may be treated where one of them defined as the constraint and another subject to optimization. The present disclosure may also be applicable for optimization of other metrics such as latency of error corrections.

In various embodiments, an objective may be to create error corrections that are easy to compress and inexpensive for decompression. Possible ways to accomplish this objective may include imposing a constraint or adding a term in an objective function that enforces or induces error corrections to be either to an identical value or by the same value. In addition, in various embodiments, inputs overcompensation in such a way that a single alternation of one or more inputs is conducted so that two or more outputs are corrected simultaneously within a specified tolerance.

In various embodiments, special attention may be placed to input alternations for error correction in linear systems and subsystem. For this type of systems, the provably optimal correction in terms of the corrected number of variables may be computed using linear programming or other techniques for solving systems of linear equations, such as Gaussian elimination and singular value decomposition.

In various embodiments, the present disclosure for efficient and effective error detection and correction using inputs compensation and overcompensation may be practiced in application in conjunction with other energy or other objective optimization techniques, such as supply and/or threshold voltage management. Also, application specific systems or programs may be designed or created to facilitate practice of the disclosure for efficient and effective error detection and correction using inputs compensation and overcompensation. For example, inputs may be intentionally added that facilitate corrections, or use retiming and pipelining to improve controllability of the pertinent computation. In various embodiments, inputs may be altered in such a way that reduce or eliminate the number of cases where a clock cycle time of a target computing platform may be violated.

Figure 5:
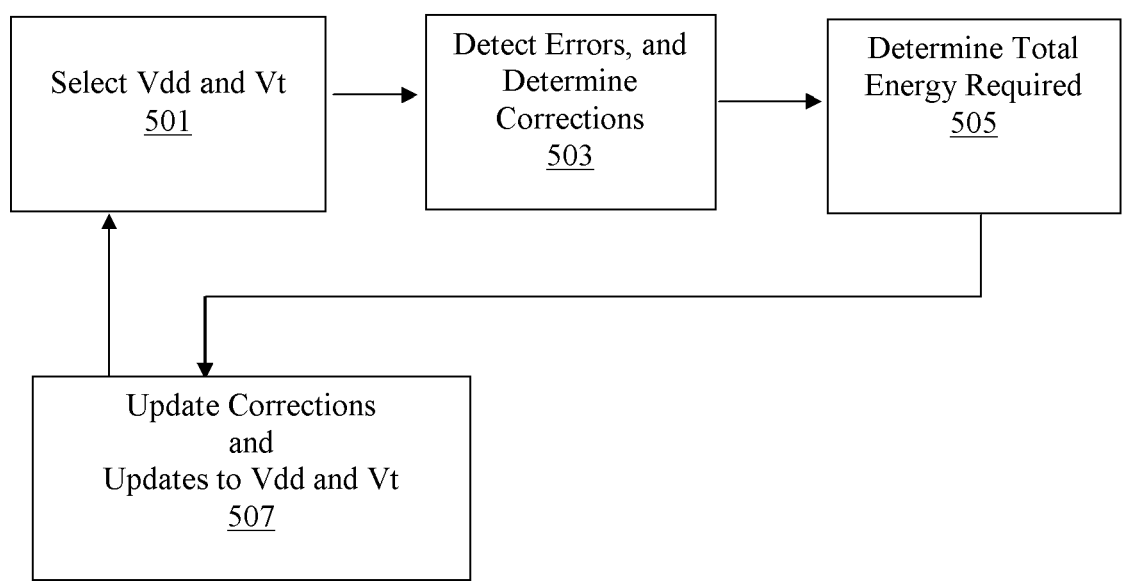
FIG. 5 illustrates an example application of the input compensated/overcompensated computing of the present disclosure to voltage management of a computing platform, in accordance with various embodiments.

FIG. 5 illustrates an example application of the input compensated/overcompensated computing of the present disclosure to voltage management of a computing platform, in accordance with various embodiments. In this example application, the supply (Vdd) and threshold (Vt) voltages may be selected for the computing platform through an optimization process that uses the input compensated/overcompensated computing of the present disclosure. The optimization is conducted with iterative employment of input compensated/overcompensated computing of the present disclosure, and the optimization is terminated after a user specified criteria, such as the targeted energy reduction or maximal run time, is met.

The optimization process may begin as illustrated at block 501 (Select Vdd and Vt), where a set of supply (Vdd) and threshold (Vt) voltages may be selected. The optimization process then moves from block 501 to block 503 (Detect Errors, and Determine Corrections), where the number of errors due to e.g. cycle time violation may be may be determined for one or more computations to be performed on the computing platform. Further, the compensations or overcompensation (corrections) to eliminate or reduce the errors may be determined. Continuing from block 503 to block 505 (Determine Total Energy Required), the total energy required for implementing the corrections when performing the computations on the computing platform may be calculated if input data is known or estimated if the input data is unknown. In various embodiments, the estimation may be conducted using simulation and statistical analysis of the obtained result. Moving from block 505 to block 507 (Update Correction and Propose updates to Vdd and Vt), the compensations or overcompensation (corrections) to eliminate or reduce the errors of the computations on the computing platform may be determined and updated, and the potentially most beneficial updates of supply and threshold voltages may be proposed.

The process may be repeated as alluded to earlier, until a user provided design criteria is met or until a predetermined limit to the number of iteration is reached. In embodiments where correction determination is delegated to another computing platform from the computing platform performing the error detection, the detected error may be provided from the error detection platform to the correction determination platform at each iteration. Note that the above describe technique may be generic in a sense that other energy, speed of execution, or design metrics may be optimized.

Figure 6:
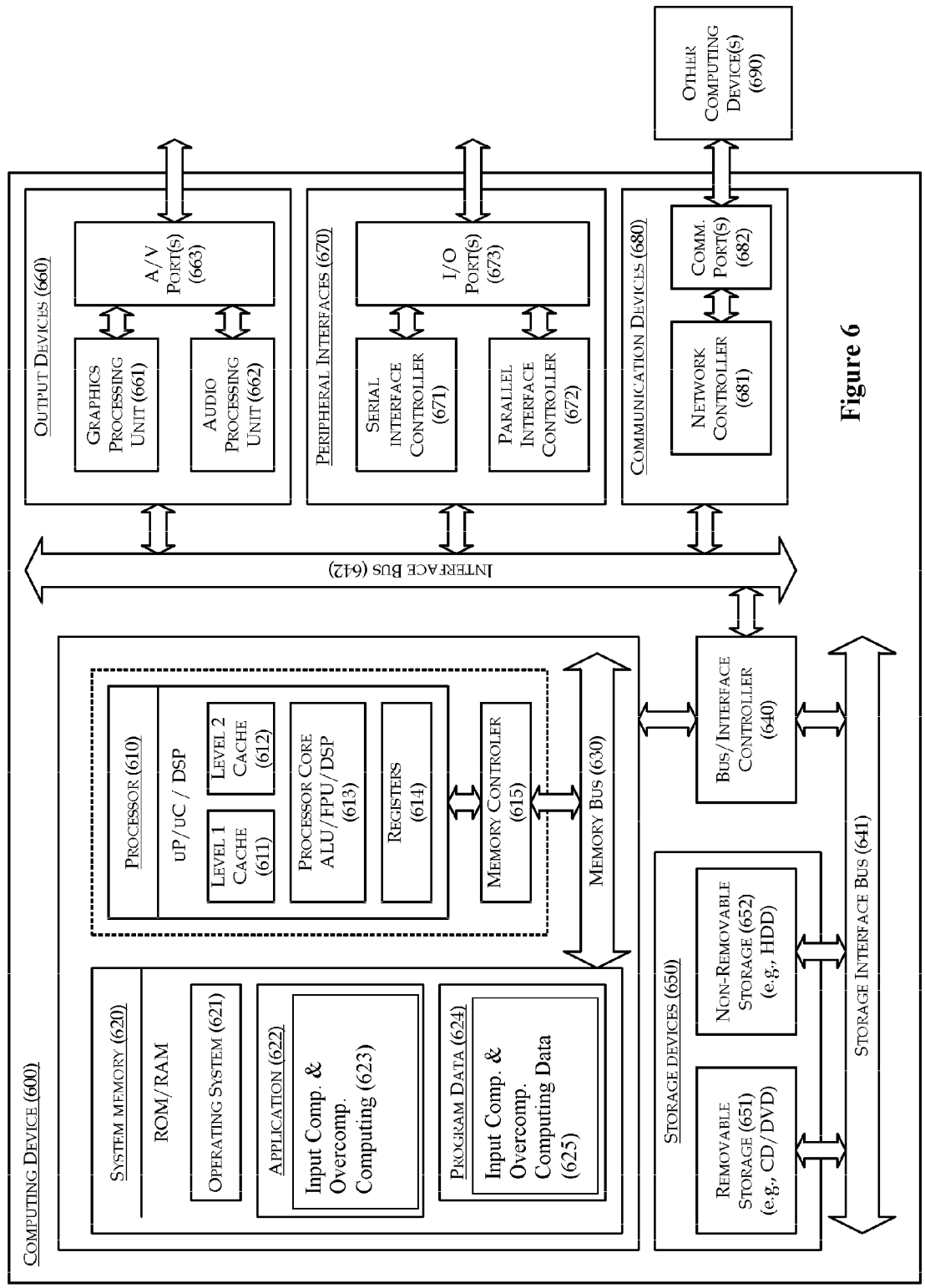
FIG. 6 illustrates a computing system configured in accordance with various embodiments.

FIG. 6 is a block diagram illustrating an example computing device configured in accordance with the present disclosure. In a very basic configuration 601, computing device 600 typically includes one or more processors 610 and system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 may include one more levels of caching, such as a level one cache 611 and a level two cache 12, a processor core 613, and registers 614. An example processor core 613 may include an arithmetic logic unit (ALU), a floating point unit (FPU), a digital signal processing core (DSP Core), or any combination thereof. An example memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof System memory 620 may include an operating system 621, one or more applications 622, and program data 624. Application 622 may include programming instructions providing logic to implement the above described input compensation or overcompensation based computing. Program Data 624 may include the applicable variable and related values associated with practicing the input compensation or overcompensation based computing of the present disclosure.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 over a network communication link via one or more communication ports 682.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configuration.

Figure 7:
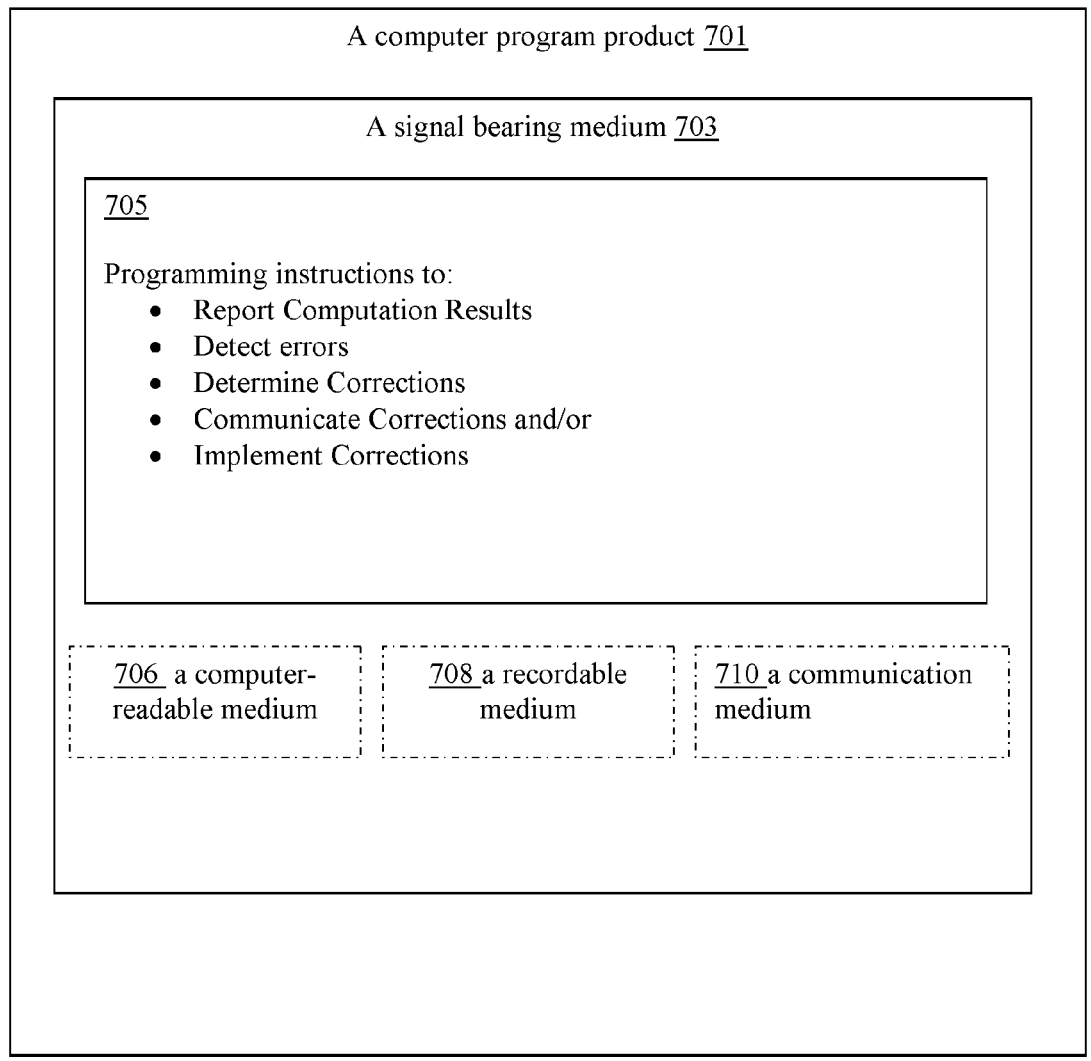
FIG. 7 illustrates a computing program product in accordance with various embodiments, all arranged in accordance with the present disclosure.

FIG. 7 illustrates a block diagram of an example computer program product 700. In some examples, as shown in FIG. 7, computer program product 700 includes a signal bearing medium 702 that may also include programming instructions 704. Programming instructions 704 may be for reporting results of a computation performed on a target computing platform (Report Computing Result). Programming instructions 704 may also be for detecting one or more errors for the computation when performed on the target computing platform (Detect Errors), as well as determining compensation and/or overcompensation to one or more inputs to the computation (Determine Corrections). Further, programming instructions 704 may also be for communicating the determined corrections to the target computing platform (Communicate Corrections). Still further, programming instructions 704 may be for implementing the corrections provided (Implement Corrections).

Also depicted in FIG. 7, in some examples, computer product 700 may include one or more of a computer readable medium 706, a recordable medium 708 and a communications medium 710. The dotted boxes around these elements depict different types of mediums included within, but not limited to, signal bearing medium 702. These types of mediums may distribute programming instructions 704 to be executed by logic. Computer readable medium 706 and recordable medium 708 may include, but are not limited to, a flexible disk, a hard disk drive (HDD), a Compact Disc (CD), a Digital Video Disk (DVD), a digital tape, a computer memory, etc. Communications medium 710 may include, but is not limited to, a digital and/or an analog communication medium (e.g., a fiber optic cable, a waveguide, a wired communication link, a wireless communication link, etc.).

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter may not be limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software may generally (but not always, in that in certain contexts the choice between hardware and software can become significant) a design choice representing cost vs. efficiency tradeoffs. There may be various vehicles by which processes and/or systems and/or other technologies described herein may be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices (e.g., nodes, RF controller, computing device, etc.) and/or methods into data processing systems. That is, at least a portion of the devices and/or methods described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This application may be intended to cover any adaptations or variations of the embodiments discussed herein. Therefore, it is manifestly intended that embodiments of the disclosure be limited only by the claims and the equivalents thereof.

What is claimed is:

1. A method for performing a computation on a computing platform, the method comprising:
    associating by the computing platform an arithmetic compensation or overcompensation with an arithmetic input to the computation, the arithmetic compensation or overcompensation to be used computationally in conjunction with the arithmetic input in performing the computation on the computing platform to at least reduce an error of the computation; and
    performing by the computing platform, the computation using the arithmetic input and computationally, the arithmetic compensation or overcompensation.

2. The method of claim 1, further comprising
    detecting the error, by the computing platform, based at least in part on a prior performing of the computation on the computing platform; and
    determining by the computing platform, the arithmetic compensation or overcompensation to be associated with the arithmetic input to at least reduce the detected error when performing the computation on the computing platform.

3. The method of claim 2, further comprising repeating the detecting and determining by the computing platform when a design metric for the computing platform has not been achieved or a repetition limit has not been reached, wherein the design metric comprises a selected one of an energy usage or a speed of execution of the computing platform.

4. The method of claim 2, wherein the computing platform has an energy usage design metric, and wherein detecting and determining are performed by the computing platform for a selected pair of supply and threshold voltages for the computing platform.

5. The method of claim 4 further comprising estimating by the computing platform an amount of energy required by the computing platform to employ the arithmetic compensation or overcompensation to the arithmetic input when performing the computation.

6. The method claim 5, wherein estimating comprises performing statistical analysis or simulation by the computing platform.

7. The method of claim 2, wherein detecting comprises detecting by the computing platform, a transitive or non-permanent error.

8. The method of claim 2, wherein determining comprises determining by the computing platform, an arithmetic compensation or overcompensation to the arithmetic input to eliminate the detected error.

9. The method of claim 1, further comprising
sending a result of the prior performing of the computation, by the computing platform, to another computing platform to at least detect the error, by the other computing platform, based at least in part on the prior performing of the computation on the computing platform.

10. The method of claim 9, further comprising
receiving by the computing platform, from the other or a third computing platform, the arithmetic compensation or overcompensation to be associated with the arithmetic input to at least reduce the detected error when performing the computation on the computing platform.

11. The method of claim 1 wherein performing comprises applying the arithmetic compensation or overcompensation to the arithmetic input prior to providing the arithmetic input to the computation.

12. A method for a computing platform to at least reduce an error of a computation performed on a target computing platform, the method comprising:
detecting by the computing platform, the error of the computation performed on the target computing platform; and
determining and providing by the computing platform to the target computation, an arithmetic compensation or overcompensation to an arithmetic input to the computation to at least reduce the error when the computation is performed on the target computing platform.

13. The method of claim 12, further comprising receiving by the computing platform, a result of a prior performing of the computation on the target computing platform.

14. The method of claim 12, further comprising performing or modeling by the computing platform, the computation to be performed by the target computing platform.

15. The method of claim 12, further comprising repeating the detecting and determining by the computing platform when a design metric for the computing platform has not been achieved or a repetition limit has not been reached, wherein the design metric comprises a selected one of an energy usage or a speed of execution of the target computing platform.

16. A method for a computing platform to correct or partially correct an error of a computation performed on a target computing platform, the method comprising:
receiving by the computing platform, from another computing platform, a description of the error of the computation performed on the target computing platform; and
determining and providing by the computing platform to the target computation, an arithmetic compensation or overcompensation to an arithmetic input to the computation to correct or partially correct the error when the computation is performed on the target computing platform.

17. The method of claim 16, further comprising repeating the receiving and determining by the computing platform when a design metric for the computing platform has not been achieved or a repetition limit has not been reached, wherein the design metric comprises a selected one of an energy usage or a speed of execution of the target computing platform.

18. An apparatus for performing a computation, the apparatus comprising:
a processor configured to execute instructions;
a storage medium coupled to the processor, and having stored therein instructions to be executed by the processor, wherein when executed, the instructions enable the apparatus to
associate an arithmetic compensation or overcompensation with an arithmetic input to a computation, the arithmetic compensation or overcompensation to be used in conjunction with the arithmetic input when performing the computation on the computing apparatus to at least reduce an error of the computation; and
perform the computation using the arithmetic input in conjunction with the arithmetic compensation or overcompensation.

19. The computing apparatus of claim 18, wherein the instructions further enable the apparatus to
detect the error based at least in part on a prior performing of the computation on the computing apparatus; and
determine the arithmetic compensation or overcompensation to be associated with the arithmetic input to at least reduce the detected error when performing the computation on the computing apparatus.

20. The computing apparatus of claim 18, wherein the instructions further enable the apparatus to repeat the detect and determine when a design metric for the computing apparatus has not been achieved or a repetition limit has not been reached, wherein the design metric comprises a selected one of an energy usage or a speed of execution of the computing platform.

21. An apparatus for at least reducing an error of a computation performed on a target computing platform, the apparatus comprising:
a processor configured to execute instructions;
a storage medium coupled to the processor, and having stored therein instructions to be executed by the processor, wherein when executed, the instructions enable the apparatus to
detect an error of a computation performed on the target computing platform; and
determine and provide to the target computation platform, an arithmetic compensation or overcompensation to an arithmetic input to the computation to at least reduce the error when the computation is performed on the target computing platform.

22. The computing apparatus of claim 21, wherein the instructions further enable the apparatus to repeat the detect and determine when a design metric for the target computing platform has not been achieved or a repetition limit has not been reached, wherein the design metric comprises a selected one of an energy usage or a speed of execution of the target computing platform.

23. An apparatus for at least reducing an error of a computation performed on a target computing platform, the apparatus comprising:
   a processor configured to execute instructions;
   a storage medium coupled to the processor, and having stored therein instructions to be executed by the processor, wherein when executed, the instructions enable the apparatus to
   receive from another computing platform, a description of the error of the computation performed on the target computing platform; and
   determine and provide to the target computation, an arithmetic compensation or overcompensation to an arithmetic input to the computation to correct or partially correct the error when the computation is performed on the target computing platform.

24. The apparatus of claim 23, wherein the instructions further enable the apparatus to repeat the receive and determine when a design metric for the target computing platform has not been achieved or a repetition limit has not been reached, wherein the design metric comprises a selected one of an energy usage or a speed of execution of the target computing platform.

25. An article of manufacture comprising:
   a computer readable storage medium; and
   a plurality of instructions stored in the storage medium, wherein the instructions are designed to be executed by a processor of an apparatus to enable the apparatus to determine and provide to a target computation platform an arithmetic compensation or overcompensation to an arithmetic input to a computation to at least reduce an error of the computation when the computation is performed on the target computing platform.

26. The article of claim 25, wherein the instructions further enable the apparatus to detect an error of the computation when performed on the target computing platform.

27. The article of claim 26, wherein the instructions further enable the apparatus to repeat the detect and determine when a design metric for the target computing platform has not been achieved or a repetition limit has not been reached, wherein the design metric comprises a selected one of an energy usage or a speed of execution of the target computing platform.

28. The article of claim 25, wherein the apparatus comprises the target computing platform.

* * * * *

UNITED STATES PATENT AND TRADEMARK OFFICE
CERTIFICATE OF CORRECTION

PATENT NO. : 8,041,992 B2
APPLICATION NO. : 12/463982
DATED : October 18, 2011
INVENTOR(S) : Potkonjak Page 1 of 1

It is certified that error appears in the above-identified patent and that said Letters Patent is hereby corrected as shown below:

In the Drawings

In Fig. 6, Drawing Sheet 5 of 6, in Box "(615)", in Line 1, delete "CONTROLER" and insert -- CONTROLLER --, therefor.

In the Specification

In Column 1, Line 38, delete "FIG." and insert -- FIGS. --, therefor.

In Column 2, Line 5, delete "alias" and insert -- alia, --, therefor.

In Column 6, Line 2, delete "12," and insert -- 612, --, therefor.

In Column 6, Line 13, delete "thereof" and insert -- thereof. --, therefor.

In the Claims

In Column 11, Line 9, in Claim 5, delete "4" and insert -- 4, --, therefor.

In Column 11, Line 15, in Claim 6, delete "method" and insert -- method of --, therefor.

In Column 11, Line 38, in Claim 11, delete "1" and insert -- 1, --, therefor.

Signed and Sealed this
Twentieth Day of August, 2013

Teresa Stanek Rea
*Acting Director of the United States Patent and Trademark Office*